Feb. 23, 1926.
F. B. CROSBY
TRAFFIC SIGNAL
Filed Sept. 10, 1924
1,574,538
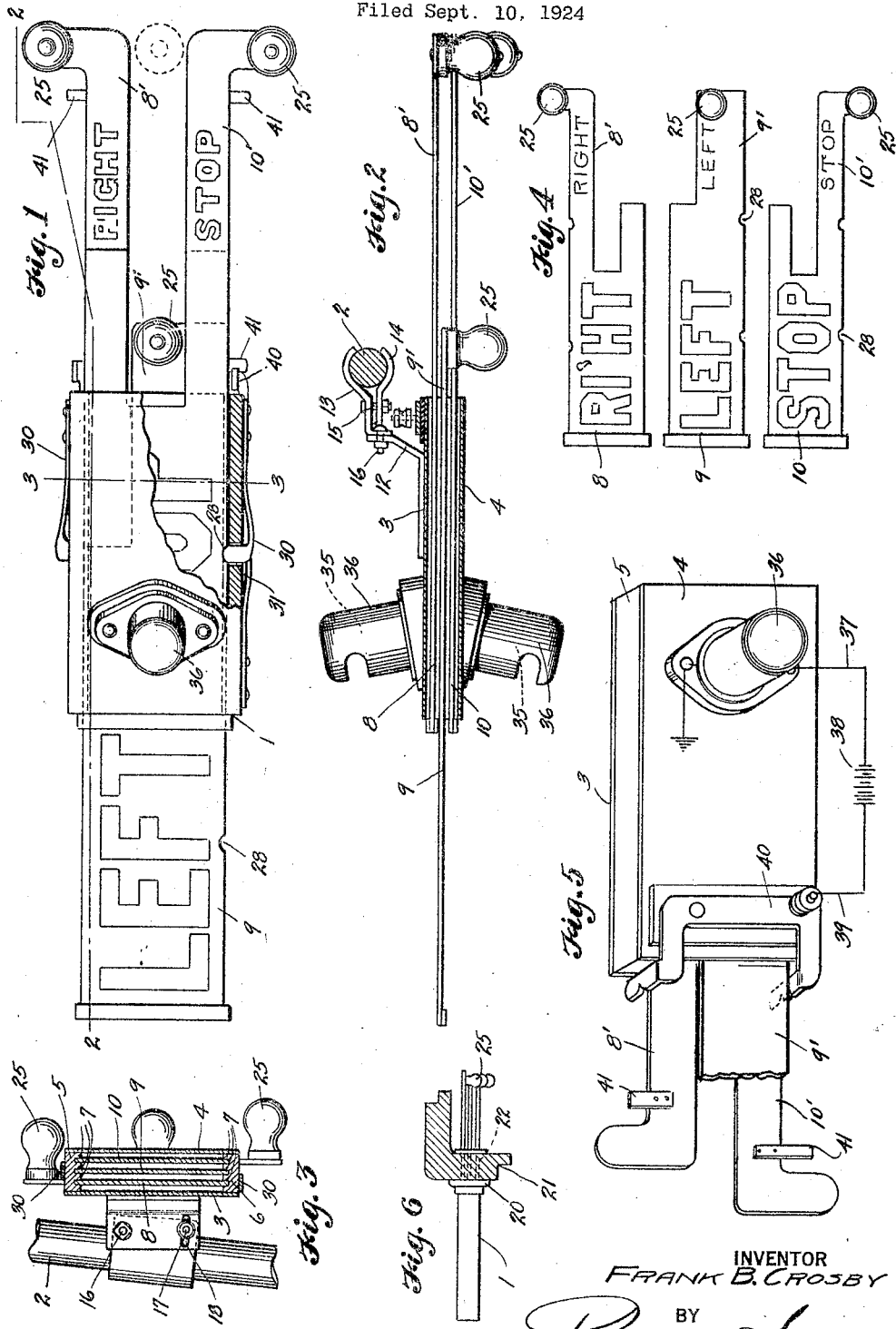
INVENTOR
FRANK B. CROSBY
BY
Richard H Cook
ATTORNEY Patented Feb. 23, 1926.

1,574,538

UNITED STATES PATENT OFFICE.

FRANK B. CROSBY, OF SEATTLE, WASHINGTON, ASSIGNOR OF ONE-HALF TO JOSEPH C. CAHOON, OF SEATTLE, WASHINGTON.

TRAFFIC SIGNAL.

Application filed September 10, 1924. Serial No. 736,853.

*To all whom it may concern:*

Be it known that I, FRANK B. CROSBY, a citizen of the United States, and a resident of Seattle, King County, Washington, have invented certain new and useful Improvements in Traffic Signals, of which the following is a specification.

This invention relates to improvements in traffic signals for motor vehicles, and more particularly to a device of that character adapted to be mounted on the windshield frame, or similar part, of an automobile and which is equipped with signaling device, operable by the driver of the vehicle, to indicate to pedestrians, or to the drivers of following or approaching vehicles, when he is about to stop or turn and the direction he intends to take.

The principal object of this invention is to provide a device of the above character adapted for use on both open or enclosed cars, and wherein the signaling devices may be moved into and from an enclosing housing by the shifting of individual knobs located at a point easily accessible to the driver.

Another object is to provide means for lighting the signals for night use.

Other objects reside in the details of construction and combination of parts embodied in the invention, and in its mode of operation.

In accomplishing these and other objects, I have provided the improved details of construction, the preferred forms of which are illustrated in the accompanying drawings, wherein—

Figure 1 is a side view of the signaling device, showing one of the signaling slides in extended or signaling position.

Figure 2 is a horizontal section, taken substantially on the line 2—2 in Figure 1.

Figure 3 is a vertical section, taken on line 3—3 in Figure 1, showing the disposition of the three slides within the housing.

Figure 4 is a disassembled view of the three signaling slides removed from the housing.

Figure 5 is a perspective view showing the circuit closing devices attached to the housing and slides and a diagrammatic wiring diagram for the electric circuit.

Figure 6 is a sectional view illustrating the mounting of the device on an enclosed car.

Referring more in detail to the several views of the drawings—

1 designates, in its entirety, a traffic signaling device embodied by the present invention, and 2 designates what may be the vertical end member of a windshield frame or similar part of an automobile to which the signal is attached.

The device comprises a housing made up of front and back face plates 3 and 4 secured by rivets or other suitable means, to the opposite sides of upper and lower spacing bars 5 and 6 extended longitudinally of the plates and which, on their inner surfaces, are each provided with three longitudinally extending guide grooves 7 wherein the signaling slide plates 8, 9 and 10 are mounted for movement into and from the outer end of the housing.

The device, when used with an open car, would be mounted on the windshield frame piece 2 by means of a bracket consisting of a part 12 that is fixed to the front wall of the housing, and clamping members 13 and 14 adapted to engage opposite sides of the piece 2 and to be clamped thereon by a bolt 15 extended through the parts, as shown in Figure 2. To compensate for the slope of the post 2, in some cars, the bracket piece 12 is pivotally fixed to the member 13 by means of a bolt 16 and a second bolt 17 extends through the piece 13 and a slot 18 in piece 12 which may be tightened to hold the housing in a vertical plane.

In the case of enclosed cars, the device would be supported by a suitable bracket, as designated at 20, preferably of a decorative character, from the frame 21 of the body and the slides, presently described, would have their actuating positions extended through slots 22 provided therefor to the interior of the car, as shown in Figure 6.

The signaling slide plates 8, 9 and 10 are of rectangular form and are provided respectively with actuating arms 8', 9' and 10' that extend from the inner end of the housing and at their inner end have knobs 25 thereon whereby they may be shifted inwardly or outwardly to move the signaling slides accordingly from and into signaling position.

On the faces of the slides I have provided the words "Right," "Left" and "Stop" and on the arms corresponding thereto have also printed these words so that the operator may more easily select the desired signal.

To prevent the signals from sliding from an adjusted position from or into the housing, I have provided them with notches 28 in their edges and have fixed spring fingers 29 to the spacing bars with inturned end portions 30 extended through openings 31 in the bars and adapted to lock within these notches to yieldingly hold the slides extended or in retracted position.

In order that the device will be effective for night use, I have mounted an electric light 35 on each side of the housing, within metal casings 36, whereby the light is permitted to fall only on the extended signal. Each light has one terminal grounded to the metal housing and has its other side connected electrically by a circuit wire 37 with one side of a source of electricity such as a battery, as designated at 38. The other side of the battery is connected by a wire 39 with a plate 40 that is insulated from the housing and against which metal fingers 41 fixed to the arms 8', 9' and 10' will engage when said arms are moved to extend their signals, and in this way a circuit will be closed through the lamps to illuminate the extended signal.

Such a device is relatively inexpensive, can be easily installed on automobiles and trucks and will serve effectively for indicating to traffic approaching or following, or to pedestrians, the intention of the driver.

Having thus described my invention, what I claim as new therein and desire to secure by Letters-Patent, is:

A device of the class described comprising a housing formed of front and back plates and upper and lower spacing bars; said bars being provided with longitudinally extending grooves on their adjacent faces, a plurality of signaling slides mounted in the housing for slidable movement into and from the same along said grooves and having notches in the edges, arms extended from the inner ends of the slides whereby they may be moved into and from signaling position, knobs at the ends of said arms, and spring fingers fixed to the housing with ends adapted to engage within the notches of said slides to yieldingly retain the latter at adjusted positions.

Signed at Seattle, King County, Washington, this 29th day of August, 1924.

FRANK B. CROSBY.